US012254745B2

(12) United States Patent
Shepherd et al.

(10) Patent No.: US 12,254,745 B2
(45) Date of Patent: Mar. 18, 2025

(54) SECONDARY MARKET AWARD PREDICTIONS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 42 days.

(21) Appl. No.: 17/393,983

(22) Filed: Aug. 4, 2021

(65) Prior Publication Data

US 2023/0037607 A1 Feb. 9, 2023

(51) Int. Cl.
*G07F 17/32* (2006.01)

(52) U.S. Cl.
CPC ...... *G07F 17/3258* (2013.01); *G07F 17/3211* (2013.01); *G07F 17/3239* (2013.01)

(58) Field of Classification Search
CPC ............. G07F 17/3258; G07F 17/3211; G07F 17/3239
See application file for complete search history.

(56) References Cited

U.S. PATENT DOCUMENTS

| | | | | |
|---|---|---|---|---|
| 9,305,434 | B2 | 4/2016 | Iddings | |
| 11,037,408 | B2 | 6/2021 | Higgins et al. | |
| 11,080,967 | B2 | 8/2021 | Higgins et al. | |
| 2001/0051539 | A1 | 12/2001 | Zach | |
| 2002/0115484 | A1 | 8/2002 | Byrne | |
| 2008/0096645 | A1 * | 4/2008 | Frerking | G07F 17/32 463/25 |
| 2009/0191960 | A1 * | 7/2009 | Van Ly | G07F 17/3232 463/27 |
| 2013/0116037 | A1 * | 5/2013 | Acres | G07F 17/3258 463/23 |
| 2016/0314656 | A1 | 10/2016 | Book | |

FOREIGN PATENT DOCUMENTS

WO WO-2006102441 A2 * 9/2006 ............. G07F 17/32

* cited by examiner

*Primary Examiner* — Robert J Utama
*Assistant Examiner* — Jeffrey K Wong
(74) *Attorney, Agent, or Firm* — Neal, Gerber & Eisenberg, LLP

(57) ABSTRACT

Systems and methods that offer a secondary market award based on one or more predictions made in association with a primary market award.

12 Claims, 6 Drawing Sheets

SECONDARY MARKET AWARD PREDICTIONS

BACKGROUND

In various embodiments, the systems and methods of the present disclosure offer a secondary market award based on one or more predictions made in association with a primary market award.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a gaming device including a processor, and a memory device that stores a plurality of instructions. When executed by the processor, the instructions cause the processor to receive an input on a predicted first identity associated with winning a first award. When executed by the processor following an occurrence of a first award triggering event, the instructions cause the processor to communicate data that results in a display, by a display device, of a second identity that won the first award. When executed by the processor responsive to a determination that the second identity that won the first award and the predicted first identity associated with winning the first award comprise the same identity, the instructions cause the processor to communicate data that results in a display, by the display device, of a second award.

In certain embodiments, the present disclosure relates to a gaming device including a processor, and a memory device that stores a plurality of instructions. When executed by the processor, the instructions cause the processor to receive an input on a prediction associated with a progressive award triggering event not occurring, wherein a first prediction associated with the progressive award triggering event not occurring is associated with a first attribute and a second, different prediction associated with the progressive award triggering event not occurring is associated with a second, different attribute. When executed by the processor responsive to an occurrence of a prediction evaluation event and a determination that the progressive award triggering event did not occur in accordance with the inputted prediction, the instructions cause the processor to communicate data that results in a display, by a display device, of another award maintained separate from the progressive award.

In certain embodiments, the present disclosure relates to a gaming system including a processor, and a memory device that stores a plurality of instructions. When executed by the processor responsive to a receipt of data associated with a first range of predictions associated with a progressive award, the instructions cause the processor to determine a first attribute associated with the first range of predictions associated with the progressive award, and communicate data that results in a display, by a display device, of the determined first attribute. When executed by the processor responsive to a receipt of data associated with a second, different range of predictions associated with the progressive award, the instructions cause the processor to determine a second, different attribute associated with the second, different range of predictions associated with the progressive award, and communicate data that results in a display, by the display device, of the determined second, different attribute.

Additional features are described herein, and will be apparent from the following Detailed Description and the figures.

DETAILED DESCRIPTION

Figure 1:
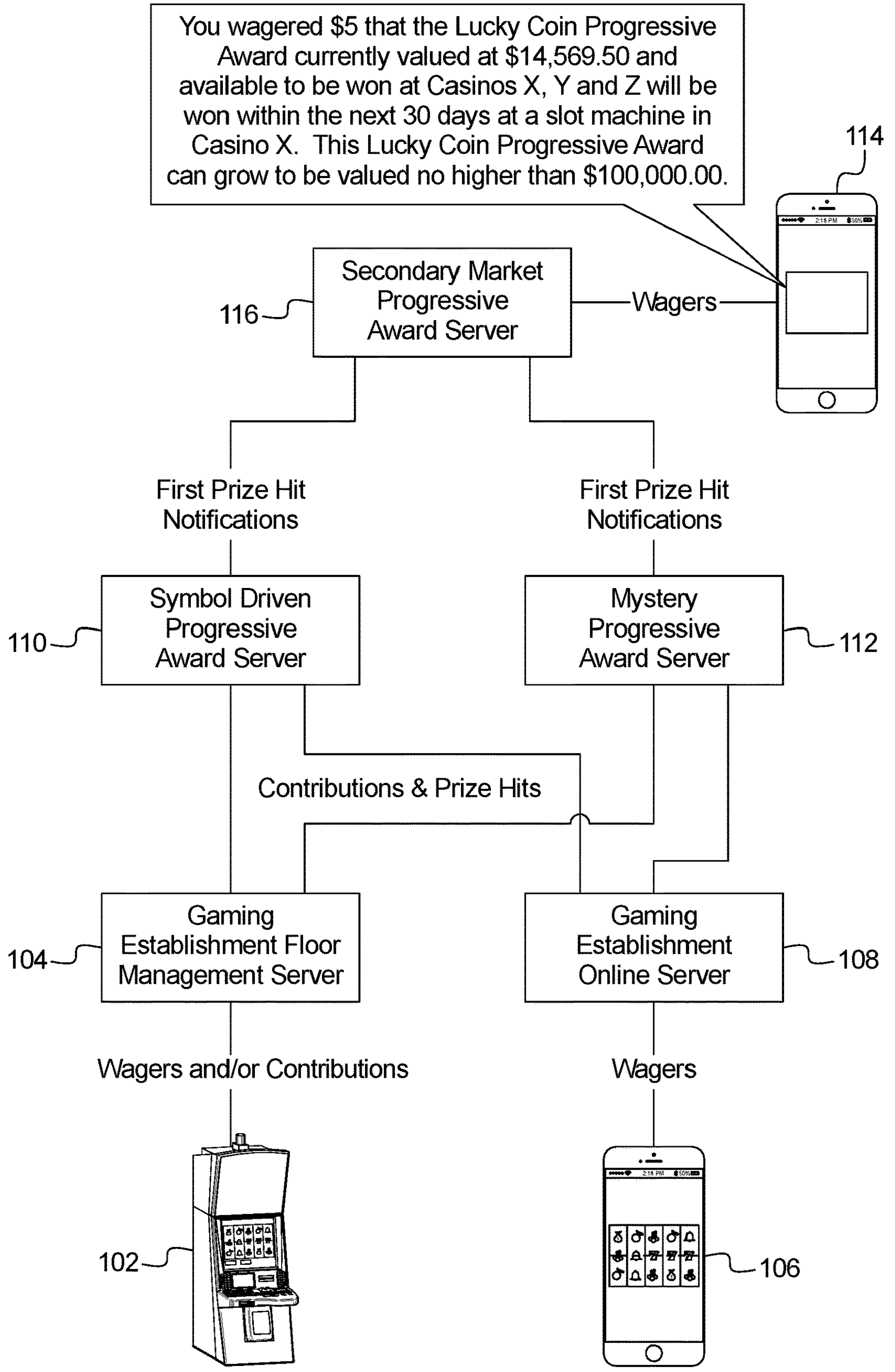
FIG. 1 is an example configuration of the architecture of a plurality of different components of the gaming system of the present disclosure.
Figure 2:
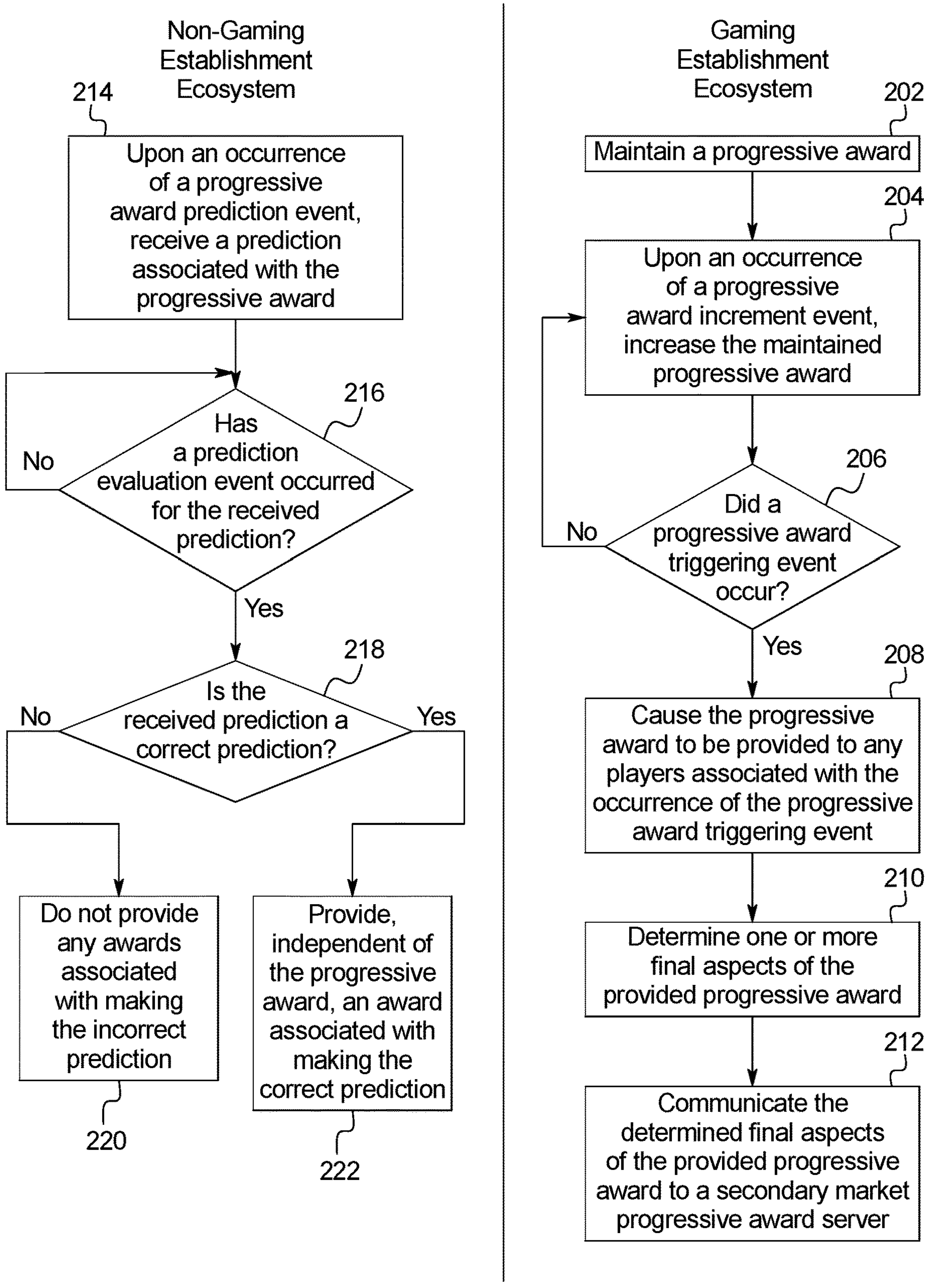
FIG. 2 is a flow chart an example process for operating a gaming system which enables predictions to be made on a progressive award.

In various embodiments, the present disclosure relates generally to systems and methods for offering one award based on one or more predictions associated with another separately maintained award.

In certain embodiments, the gaming system maintains a first award in association with a gaming establishment. The gaming system funds the first award via one or more wagers placed on one or more plays of one or more games offered at or otherwise in association with the gaming establishment. For example, the gaming system allocates a portion of wagers placed at an electronic gaming machine ("EGM") associated with a gaming establishment to a progressive award wherein various aspects of the progressive award, such as a final value of the progressive award, when the progressive award will be provided, and which player will win the progressive award, are unknown.

In addition to maintaining the first award and separate from the gaming establishment and any plays of any games offered at or otherwise in association with the gaming establishment, the gaming system enables the placement of one or more wagers on one or more predictions associated with the first award. Such predictions pertain to any suitable aspect or combination of aspects associated with the first award. Continuing with the above example, the gaming system enables users of personal gaming devices to predict a final value of the progressive award, predict a player whom will win the progressive award, predict an EGM associated with winning the progressive and/or predict when the progressive award will be provided (or not provided). The gaming system accumulates the wagers placed on the predictions separate from the first award, wherein, in certain instances, a greater portion of the wagers placed on the predictions are available to be returned as a second award compared to the portion of the wagers placed on the plays of the games associated with the gaming establishment that may be returned as the first award.

Upon a determination that a prediction associated with the first award is a winning prediction, the gaming system causes part or all of the accumulated wagers placed on the predictions associated with the first award to be provided as a second award. That is, separate from the opportunities to win a first award in association with activities occurring at or otherwise in association with a gaming establishment, the gaming system offers one or more opportunities to win a second award which is separate from the first award and at least partially determined in association with the first award. In other words, in addition to providing a primary market associated with a gaming establishment to win a first award, the gaming system provides a secondary market separate from the gaming establishment to make predictions on the first award to win a second award. Such a configuration of enabling predictions to be made, independent of a gaming establishment, on an event occurring at the gaming establishment offers more opportunities for users to win awards separate from being anchored to the gaming establishment. Put differently, the secondary market created by the present disclosure frees players from having to be located at a gaming establishment to win one or more awards based on predictions associated with the gaming establishment, thereby increasing the quantity of opportunities to win awards and the corresponding values of such awards (i.e., increasing the base of wagered on predictions via increasing the quantity of gaming devices enabled to make such wagered on predictions results in larger awards available to be won for making winning predictions).

In certain embodiments, to account for the different predictions available to be wagered on in association with the first award and the differences between these predictions, the gaming system determines one or more aspects of the wager placed on the prediction and/or the second award won for a correct prediction based on the underlying prediction made. That is, to mitigate any unfairness between winning a relatively easy prediction (e.g., a prediction that a progressive award will be awarded to any player having a specific player tracking status) and winning a relatively hard prediction (e.g., a prediction that a progressive award will be awarded to a specific player), the gaming system modifies the amount of the wager placed on the prediction and/or the amount of the second award won for a correct prediction, based on the type of prediction made and how that prediction relates to other predictions available to be made. In other words, since different predictions are associated with different probabilities of being correctly made, the gaming system accounts for such different probabilities in determining the costs to make such predictions and/or the benefits received in correctly making such predictions. Such a configuration ensures fairness in association with providing different opportunities to make different predictions on different aspects of an award.

It should be appreciated that while certain embodiments described below are directed to making predictions on a progressive award won in association with one or more symbol-driven events (i.e., an event which occurs based on one or more game elements displayed in association with one or more plays of one or more games), it should be appreciated that such embodiments may additionally or alternatively be employed in association with making predictions on a progressive award won in association with one or more mystery-driven events (i.e., an event which occurs independent of any game elements displayed in association with any plays of any games). To that end, in various embodiments, the gaming system of the present disclosure includes (or is otherwise in communication with) various components or sub-systems that collectively operate to maintain zero, one or more symbol-driven progressive awards in association with one or more gaming establishments, maintain zero, one or more mystery progressive awards in association with one or more gaming establishments, and enable zero, one or more predictions to be made on such progressive awards independent from any gaming establishments.

More specifically, while wagers placed at gaming devices associated with a gaming establishment offer an opportunity to win a progressive award, the gaming system additionally includes (or is otherwise associated with) one or more gaming devices independent of any gaming establishment where one or more predictions on the same progressive award may be separately wagered on by these gaming devices independent of the gaming establishment. That is, in addition to offering an opportunity to win a progressive award in a gaming establishment ecosystem (i.e., a primary market), the present disclosure offers an opportunity to make one or more predictions or combination of predictions on the progressive award to win additional awards that are separate from the progressive award in a non-gaming establishment ecosystem (i.e., a secondary market) For example, as seen in FIG. 1, the gaming system includes certain gaming devices that are part of the gaming establishment ecosystem, such as EGMs 102 in communication with a gaming establishment floor management server 104 and personal gaming devices 106 in communication with a gaming establishment online server 108. The gaming devices offer plays of wagering games wherein certain portions of certain wagers placed at such gaming devices contribute to one or more progressive awards, such as a symbol-driven progressive award (not shown) maintained by a symbol-driven progressive award server 110 and/or a mystery progressive award (not shown) maintained by a mystery progressive award server 112.

As further seen in FIG. 1, the gaming system also includes (or is otherwise in communication with) certain gaming devices that are not part of the gaming establishment ecosystem, such as personal gaming devices 114 in communication with a secondary market progressive award server 116. Independent of the location of such gaming devices (which may be located at a gaming establishment (e.g., if jurisdictional regulations require that any secondary market wagers on any predictions associated with a progressive award are made at a gaming establishment) and/or located remote from any gaming establishments (e.g., if no such jurisdictional regulations require secondary market wagers on any predictions associated with a progressive award be made at a gaming establishment)), such gaming devices are independent of the gaming establishment ecosystem, independent of any servers that maintain any progressive awards, and do not offer any plays of any wagering games. Rather, as described below, such gaming devices enable one or more wagers to be placed on one or more predictions associated with one or more progressive awards maintained by the progressive award servers in association with one or more gaming establishments. Such a configuration of personal gaming devices 114 not being in communication with any progressive award servers of the gaming establishment ecosystem, but rather being in communication with the secondary market progressive award server 116 (which is in communication with the symbol-driven progressive award server 110 and the mystery progressive award server 112) exponentially expands the wagering opportunities associated with progressive awards by offering such opportunities beyond the relatively limited quantity of gaming devices at which a progressive award may be won. As such, the secondary market progressive award server operates to process any secondary market wagers placed (i.e., wagers placed that do not contribute to any progressive awards maintained in association with any gaming establishments) on any predictions on any primary market progressive awards (i.e., progressive awards maintained in association with one or more gaming establishments). The secondary market progressive award server further operates to process any awards results from any secondary market wagers placed on any predictions on any primary market progressive awards.

In operation of certain embodiments of the gaming system of the present disclosure, the gaming system maintains a progressive award as indicated in block 202. In certain embodiments, the progressive award is a stand-alone progressive award associated with a single gaming device associated with a gaming establishment. In certain embodiments, the progressive award is part of a plurality of progressive awards maintained in a multi-level progressive award configuration ("MLP") associated with a single gaming device associated with a gaming establishment. In certain embodiments, the progressive award is a stand-alone progressive award associated with a plurality of gaming devices associated with one or more gaming establishments. In certain embodiments, the progressive award is part of a plurality of progressive awards maintained in an MLP associated with a plurality of gaming devices associated with one or more gaming establishments. In different embodiments wherein the progressive award is associated with a plurality of gaming devices, the gaming devices may be a plurality of EGMs in the same bank of EGMs or in the same gaming establishment (such that the progressive award may be considered a local area progressive ("LAP")) or the gaming devices may be in (or otherwise associated with) two or more different gaming establishments (such that the progressive award may be considered a wide area progressive ("WAP")).

In certain embodiments, the gaming system maintains a single progressive award which a single type of prediction may be made in association with. In certain embodiments, the gaming system maintains a single progressive award which a plurality of different types of predictions or combinations of predictions may be made in association with. In certain embodiments, the gaming system maintains a plurality of progressive awards each of which a single type of prediction may be made in association with. In certain embodiments, the gaming system maintains a plurality of progressive awards each which a plurality of different types of predictions or combinations of predictions may be made in association with. It should be appreciated that any suitable configuration of associating available predictions with one or more progressive awards may be employed in association with the gaming system of the present disclosure.

In certain embodiments, the gaming system causes a current value of the progressive award to be displayed to one or more players at one or more gaming devices where such a progressive award may be won. In certain embodiments, the gaming device where a progressive award may be won comprises an EGM associated with a gaming establishment (i.e., a gaming device part of the gaming establishment ecosystem), such as a slot machine, a video poker machine, a video lottery terminal, a terminal associated with an electronic table game, a terminal associated with a live table game, a video keno machine, a video bingo machine and/or a sports betting terminal (that offers sports betting opportunities and, in certain instances, wagering games)). In certain embodiments, the gaming device where a progressive award may be won comprises a personal gaming device associated with a gaming establishment (i.e., a gaming device part of the gaming establishment ecosystem), such as desktop computers, laptop computers, tablet computers or computing devices, personal digital assistants, mobile phones, and other mobile computing devices that enable a user to access a website associated with a gaming establishment and/or execute a gaming establishment application to offer plays of wagering games (and in certain instances, offer sports betting opportunities). In these embodiments, the games available to be wagered on and win one or more awards include one or more of: one or more plays of a slot game, one or more plays of any suitable wheel game, one or more plays of any suitable card game, one or more plays of any suitable multi-hand card game, one or more plays of any suitable offer and acceptance game, one or more plays of any suitable award ladder game, one or more plays of any suitable puzzle-type game, one or more plays of any suitable persistence game, one or more plays of any suitable selection game, one or more plays of any suitable cascading symbols game, one or more plays of any suitable ways to win game, one or more plays of any suitable scatter pay game, one or more plays of any suitable coin-pusher game, one or more plays of any suitable elimination game, one or more plays of any suitable trail game, one or more plays of any suitable bingo game, one or more plays of any suitable video scratch-off game, one or more plays of any suitable pick-until-complete game, one or more plays of any suitable shooting simulation game, one or more plays of any suitable racing game, one or more plays of any suitable high-low game, one or more plays of any suitable lottery game, one or more plays of any suitable number selection game, one or more plays of any suitable dice game, one or more plays of any suitable skill game, one or more plays of any suitable auction game, one or more plays of any suitable reverse-auction game, one or more plays of any suitable group game, and/or one or more plays of any suitable game of the present disclosure.

In certain embodiments, the gaming system causes a current value of the progressive award to be displayed to one or more players at one or more gaming devices where such a progressive award may not be won. In certain embodiments, the gaming device where a progressive award may not be won comprises a personal gaming device not associated with a gaming establishment (i.e., a gaming device not part of the gaming establishment ecosystem), such as desktop computers, laptop computers, tablet computers or computing devices, personal digital assistants, mobile phones, and other mobile computing devices that enable a user to access a website associated with the secondary market progressive award server and/or execute an application associated with the secondary market progressive award server to make one or more predictions regarding the progressive award (without offering the ability to win the progressive award). In certain embodiments, the gaming device where a progressive award may not be won comprises a kiosk and/or interface that enable a user to make one or more predictions regarding a progressive award without offering the ability to win the progressive award.

In certain embodiments, upon an occurrence of a progressive award increment event, the gaming system increases the maintained progressive award as indicated in block 204. In one such embodiment, the progressive award increment event occurs based on (or as a result of) a wager being placed on a play of a game at a gaming device associated with the progressive award. In this embodiment, the increase of the maintained progressive award is funded by a portion of the wager placed (e.g., 20% of the amount of wager placed is allocated to growing the progressive award). In another such embodiment, the progressive award increment event additionally or alternatively occurs based on (or as a result of) a side wager being placed at a gaming device associated with the progressive award. In this embodiment, the increase of the maintained progressive award is funded by part or all of the side wager placed (e.g., 50% of the amount of side wager placed is allocated to growing the progressive award). In certain embodiments, each of the progressive awards maintained by the gaming system have the same contribution rate (i.e., the portion of the wager placed allocated to the progressive award) and/or the same progressive award reset value. In certain embodiments, a plurality of the progressive awards maintained by the gaming system have different contribution rates and/or different progressive award reset values. In another such embodiment, the progressive award increment event additionally or alternatively occurs based on (or as a result of) one or more displayed events occurring in association with one or more plays of one or more games. In another such embodiment, the progressive award increment event occurs independent of any displayed events associated with any plays of any games. It should be appreciated that since an amount of the progressive award increases by variable amounts at variable points in time until being provided to an unknown recipient, a predicted final amount of the maintained progressive award as well as whom will win the progressive award and when are unknown (and unpredictable) prior to a determination of the final aspects of the progressive award.

In addition to increasing the maintained progressive award upon an occurrence of a progressive award increment event, as indicated in diamond 206, the gaming system determines if a progressive award triggering event occurred. In certain embodiments, a determination of if a progressive award triggering event occurred is based on (or as a result of) one or more displayed events occurring in association with one or more plays of one or more games. In certain such embodiments, the symbol-driven progressive award server determines whether any symbol, combination of symbols or content displayed by the gaming device in association with any play of any game resulted in an occurrence of a symbol-driven progressive award triggering event. In another embodiment, a determination of if a progressive award triggering event occurred independent of any displayed events associated with any plays of any games. In certain such embodiments, the mystery progressive award server determines whether, independent of any symbol, any combination of symbols or any content displayed by the gaming device in association with any play of any game, a mystery progressive award triggering event occurred.

If the gaming system determines that a progressive award triggering event did not occur, the gaming system returns to block 204 and awaits an occurrence of the progressive award increment event (or an occurrence of a progressive award triggering event if such an event occurs before another progressive award increment event). On the other hand, if the gaming system determines that a progressive award triggering event occurred, the gaming system causes the progressive award to be provided to any players associated with the occurrence of the progressive award triggering event as indicated in block 208.

In addition to causing the progressive award to be provided, the gaming system determines one or more final aspects of the provided progressive award and communicates such determined aspects to the secondary market progressive award server as indicated in blocks 210 and 212. The secondary market progressive award server stores the aspects of the provided progressive award in one or more databases and, as described below, utilizes zero, one or more of such final aspects of the progressive awards to resolve one or more wagers placed on one or more predictions associated with the progressive award. In different embodiments, the final aspects of the progressive award include, but are not limited to, a final amount of the progressive award, a time when the progressive award was won, a location where the progressive award was won, a player whom won the progressive award, any attributes associated with the player whom won the progressive award, a gaming device (e.g., an EGM or personal gaming device that offer an opportunity to win the progressive award) where the progressive award was won, any attributes associated with the gaming device where the progressive award was won, and/or any attributes associated with the occurrence of the progressive award triggering event (e.g., a payline which a winning progressive award symbol combination was generated along).

It should be appreciated that in addition to offering an opportunity to win the maintained progressive award as part of the gaming establishment ecosystem, the gaming system enables one or more players at one or more gaming device external from the gaming establishment ecosystem the opportunity to win an award that is separate from the progressive award but based on one or more predictions made or combinations of predictions made associated with the progressive award. In these embodiments, upon an occurrence of a progressive award prediction event, the gaming system receives a prediction associated with the progressive award as indicated in block 214. In certain embodiments, the received prediction includes a wager amount placed on one or more predicted aspects of the progressive award and/or whether one or more predicted events associated with the progressive award will or will not occur.

In certain embodiments, a progressive award prediction event occurs based on the receipt of a wager and a prediction of one or more aspects of the progressive award maintained in association with one or more gaming establishments. In certain embodiments, a progressive award predication event occurs based on the receipt of a wager and a prediction of one or more aspects of the progressive award maintained in association with one or more gaming establishments and the satisfaction of one or more conditions. For example, if a progressive award predication event includes a player placing a wager on a predicted final aspect of a progressive award, the opportunity to place such a wager may be available to the player so long as one or more conditions are satisfied, such as the player has set up an account with the secondary market progressive award server and/or the player has achieved a designated player tracking status level.

In certain embodiments, the prediction associated with the progressive award is received from a gaming device where a progressive award may not be won, such as a personal gaming device not associated with a gaming establishment (i.e., a gaming device not part of the gaming establishment ecosystem) that enables a user to access a website associated with the secondary market progressive award server and/or execute an application associated with the secondary market progressive award server to make one or more predictions regarding the progressive award (without offering the ability to win the progressive award), a kiosk and/or interface that enable a user to make one or more predictions regarding a progressive award without offering the ability to win the progressive award.

In certain embodiments, an aspect of the progressive award that one or more predictions may be made about are a final value of the maintained progressive award. For example, the gaming system enables a player at a gaming device operating independent from any gaming establishment to make a prediction that the final value of a progressive award will be an identified discrete value. In certain embodiments, an aspect of the progressive award that one or more predictions may additionally or alternatively be made about are a range of final values of the maintained progressive award. For example, the gaming system enables a player at a gaming device operating independent from any gaming establishment to make a prediction that the final value of a progressive award will be within an identified range of values. In certain embodiments, an aspect of the progressive award that one or more predictions may be made about are a value of the maintained progressive award that will not be the final value of the progressive award. For example, the gaming system enables a player at a gaming device operating independent from any gaming establishment to make a prediction that the final value of a progressive award will not be an identified discrete value or within an identified range of values.

In certain embodiments, an aspect of the progressive award that one or more predictions may additionally or alternatively be made about are a point in time that the maintained progressive award will be won (i.e., when a progressive award triggering event will occur). For example, the gaming system enables a player at a gaming device operating independent from any gaming establishment to make a prediction that a progressive award will be won on an identified day. In certain embodiments, an aspect of the progressive award that one or more predictions may additionally or alternatively be made about are a period of time that the maintained progressive award will be won (i.e., a range of points in time when a progressive award triggering event will occur). For example, the gaming system enables a player at a gaming device operating independent from any gaming establishment to make a prediction that a progressive award will be won during an identified week or month. In certain embodiments, an aspect of the progressive award that one or more predictions may be made about are a point in time/period of time that the progressive award will not be won. For example, the gaming system enables a player at a gaming device operating independent from any gaming establishment to make a prediction that a progressive award will not be won on an identified day or during an identified week or month.

In certain embodiments, an aspect of the progressive award that one or more predictions may additionally or alternatively be made about are an identity of an EGM where the maintained progressive award will be won. For example, the gaming system enables a player at a gaming device operating independent from any gaming establishment to make a prediction that a progressive award triggering event will occur in association with an identified EGM, such as a specific identified EGM at a specific gaming establishment or a specific identified type of EGM (e.g., EGMs of a certain theme or featuring a certain game). In certain embodiments, an aspect of the progressive award that one or more predictions may additionally or alternatively be made about are a range of identities of an EGM where the maintained progressive award will be won. For example, the gaming system enables a player at a gaming device operating independent from any gaming establishment to make a prediction that a progressive award triggering event will occur in association with an identified group of EGMs, such as EGMs located in an identified area of a gaming establishment or EGMs of an identified denomination. In certain embodiments, an aspect of the progressive award that one or more predictions may be made about are an EGM or a group of EGMs that the progressive award will not be won in association with.

In certain embodiments, an aspect of the progressive award that one or more predictions may additionally or alternatively be made about are an identity of an anonymous player whom will win the maintained progressive award. For example, the gaming system enables a player at a gaming device operating independent from any gaming establishment to make a prediction, from a list of anonymous players, of an identified anonymous player whom will win the maintained progressive award. In certain embodiments, an aspect of the progressive award that one or more predictions may additionally or alternatively be made about are an identity of a group of anonymous players, any one of which whom will win the maintained progressive award. For example, the gaming system enables a player at a gaming device operating independent from any gaming establishment to make a prediction, from a list of anonymous players, of a group of identified anonymous players, such as anonymous players of an identified player tracking level, any one of which whom will win the maintained progressive award. In different examples, the gaming system displays different attributes of the anonymous players such as the player tracking levels of such anonymous players, the progressive awards zero, one or more of such anonymous players have historically won, wagering history of such anonymous players and/or wagering winnings of such anonymous players. In certain embodiments, an aspect of the progressive award that one or more predictions may be made about are an identified anonymous player or an identified group of anonymous players that will not win the progressive award.

In certain embodiments, following the receipt of the prediction associated with the maintained progressive award and the wager amount placed on that prediction, data associated with the prediction and the wager amount is communicated to the secondary market progressive server which tracks such predictions made in one or more databases and maintains one or more award pools funded by wager amounts placed independent of the gaming establishment. In these embodiments, upon an occurrence of a progressive award prediction event and the receipt of a prediction and a wager placed on that prediction, the gaming system (and more specifically the secondary market progressive award server) increases an award pool (which is used to fund part or all of one or more awards for one or more correct predictions) based on part or all of the amount of the wager placed on the received prediction. In certain such embodiments, a higher percentage of the wager placed on the received prediction is allocated to the award pool than a percentage of the wager placed on the play of the game at the gaming device associated with the progressive award is allocated to the progressive award. That is, since the wager placed on the prediction does not need to fund any non-progressive award wins of any plays of any games, more of the wager placed on the prediction may be allocated to the award pool (relative to a wager placed on a play of a game which needs to fund the progressive award and any non-progressive award wins for the play of the game). For example, while 20% of an amount of a wager placed on a play of a game which offers an opportunity to win a progressive award is allocated to growing the progressive award, 80% of the wager placed on the received prediction is allocated to the award pool. In certain embodiments, upon an occurrence of a progressive award prediction event, the gaming system increases a reserve award pool (which is used to fund part or all of one or more future award pools for one or more correct predictions) based on part or all of the amount of the wager placed on the received prediction.

In certain embodiments, to account for the different predictions available to be wagered on in association with the progressive award and the differences between these predictions, the gaming system determines one or more aspects of the wager placed on the prediction based on the underlying prediction made. That is, to mitigate any unfairness between a relatively easy prediction to make (e.g., a prediction that a progressive award will be awarded within the next month) and a relatively hard prediction (e.g., a prediction that a progressive award will be awarded within the next two days), the gaming system modifies the amount of the wager placed on the prediction based on the type of prediction made and how that prediction relates to other predictions available to be made. For example, to win the same award amount, the gaming system requires that a first wager amount be placed on a relatively easy prediction while a second, lesser wager amount be placed on a relatively hard prediction. In other words, since different predictions are associated with different probabilities of being correctly made, the gaming system accounts for such different probabilities in determining the costs to make such predictions. Such a configuration ensures fairness in association with providing different opportunities to make different predictions on different aspects of the same progressive award.

Following the receipt of a prediction associated with the progressive award, the gaming system (and specifically the secondary market progressive award server) determines if a prediction evaluation event has occurred for the received prediction as indicated in diamond 216. It should be appreciated that since different predictions may be placed on the same aspect of a progressive award and/or on different aspects of a progressive award, the gaming system (and specifically the secondary market progressive award server of certain embodiments) may be determining if different prediction evaluation events occur for different received predictions at different points in time or at the same point in time.

In certain embodiments, a prediction evaluation event occurs in association with an occurrence of a progressive award triggering event. In these embodiments, since certain predictions cannot be determined until after the final aspects of the progressive award are determined following the progressive award triggering event, the gaming system (and specifically the secondary market progressive award server of certain embodiments) determines that the prediction evaluation event occurs in association with the progressive award triggering event. For example, if a player made a prediction on a location of an EGM where a progressive award will be won, that prediction cannot be evaluated until the progressive award is won and a location of the EGM that won the progressive award is known.

In certain embodiments, a prediction evaluation event occurs independent of an occurrence of a progressive award triggering event. In these embodiments, since certain predictions can be determined prior to the final aspects of the progressive award are determined following the progressive award triggering event, the gaming system (and specifically the secondary market progressive award server) determines that the prediction evaluation event occurs separate from the progressive award triggering event. For example, if a player made a prediction that a progressive award will not be provided to any players prior to a specific point in time, then if that specific point in time has passed and the progressive award triggering event has not occurred, that prediction can be evaluated as a winning or losing prediction.

If a prediction evaluation event has not occurred for the received prediction, the gaming system periodically redetermines if a prediction evaluation event has occurred for the received prediction as indicated in diamond 216. On the other hand, if the prediction evaluation event has occurred for the received prediction, the gaming system (and specifically the secondary market progressive award server in certain embodiments) determines if the received prediction is a correct prediction as indicated in diamond 218. That is, following a determination that the gaming system has enough information to resolve a prediction made as a winning prediction or a losing prediction, the gaming system proceeds with resolving that prediction. In certain embodiments, the gaming system has enough information to resolve a prediction made as a winning prediction or a losing prediction after the final aspects of the provided progressive award are determined and communicated to the secondary market progressive award server. For example, a prediction on an identity of an entity associated with winning a progressive award, such as a player whom wins the progressive award and/or an EGM that provides a progressive award, can only be resolved after the identity of such an entity (i.e., the final aspects of the provided progressive award) are determined and communicated to the secondary market progressive award server. In certain embodiments, the gaming system has enough information to resolve a prediction made as a winning prediction or a losing prediction prior to the final aspects of the provided progressive award being determined and communicated to the secondary market progressive award server. For example, a prediction on a final amount of a progressive award and/or a selected point in time when the progressive award will be won can be resolved (as a losing prediction) after the progressive award increments past the predicted final amount and/or after the selected point in time has passed, wherein such a resolution of the prediction occurs independent of the occurrence of the progressive award triggering event (and thus independent of any final aspects of the not-yet provided progressive award being determined and communicated to the secondary market progressive award server).

If the gaming system determines that the received prediction is not a correct prediction, as indicated in block 220, the gaming system does not provide any awards to the player associated with making that incorrect prediction. In other words, if a player made an incorrect or losing prediction on a wagered on aspect (or combination of aspects) of the progressive award, the gaming system does not cause any awards to be provided for such an incorrect prediction. For example, if the player made a prediction, from a list of anonymous players, that a player of a first player tracking level would win the progressive award and a player not of that first player tracking level won the progressive award, the gaming system determines that the prediction made is a losing prediction and the player whom made the losing prediction is not entitled to any award for such a losing prediction.

On the other hand, if the gaming system determines that the received prediction is a correct prediction, as indicated in block 222, the gaming system provides, independent of the progressive award, an award to the player associated with making that correct prediction. In these embodiments, if a player made a correct or winning prediction on a wagered on aspect (or combination of aspects) of the progressive award, the gaming system causes one or more awards to be provided for such a correct prediction. For example, if a player made a prediction on a location of an EGM where a progressive award will be won and the predicted location was correct, the gaming system causes one or more awards to be provided for the correct prediction.

In certain embodiments, the gaming system (and specifically the secondary market progressive award server of certain embodiments) funds the award for making a correct prediction from the award pool maintained by the gaming system. In these embodiments, while one or more predictions are made regarding a progressive award, no portion of the progressive award is utilized to fund the award for making any correct predictions regarding the progressive award. In certain other embodiments, the gaming system funds the award for making a correct prediction from the award pool maintained by the gaming system and a portion of the progressive award which the correct prediction was made on. In certain other embodiments, the gaming system funds the award for making a correct prediction with a portion of the progressive award which the correct prediction was made on.

In certain embodiments, to account for the different predictions available to be wagered on in association with the progressive award and the differences between these predictions, the gaming system determines one or more aspects of the award won for making a correct prediction based on the underlying prediction made. That is, to mitigate any unfairness between winning a relatively easy prediction (e.g., a prediction that a final amount of a progressive award will be within a first, relatively large range of final amounts) and winning a relatively hard prediction (e.g., a prediction that the final amount of the progressive award will be within a second, relatively small range of final amounts), the gaming system modifies the amount of the award won for making the correct prediction, based on the type of prediction made and how that prediction relates to other predictions available to be made. For example, for the same wager amount placed, the gaming system determines a first award for correctly making a relatively easy prediction and the gaming system determines a second, greater award for correctly making a relatively hard prediction. In other words, since different predictions are associated with different probabilities of being correctly made, the gaming system accounts for such different probabilities in determining the benefits received in correctly making such predictions. Such a configuration ensures fairness in association with providing different opportunities to make different predictions on different aspects of an award.

In certain embodiments, the award for making the correct prediction includes one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps (e.g., a free dinner, a free night's stay at a hotel), a relatively high value product (e.g., a free car), one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In certain embodiments, the award for making a correct prediction includes an activation of a feature of a game the next time the player whom made the correct prediction is at a gaming device operable to provide wagering games. In different embodiments, such features include any feature that results in a modification of one or more components, aspects, or elements of one or more subsequent plays of a game, such as the modification of one or more game outcomes of one or more plays of a game (e.g., the symbols evaluated for the play(s) of the game), the modification of the paytable utilized for one or more plays of the game and/or the modification of any award determined for one or more plays of the game. In different embodiments, such features include, but are not limited to: a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a modifier, such as a multiplier, feature; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

In different embodiments, as described above, a progressive award increment event, a progressive award triggering event, a progressive award prediction event and/or a prediction evaluation event occurs based on an outcome associated with one or more plays of any primary games or any secondary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game (and/or a secondary game) causes such conditions to be satisfied and/or one or more of such events to occur.

In different embodiments, the gaming system does not provide any apparent reasons to the players for an occurrence of a progressive award increment event, a progressive award triggering event, a progressive award prediction event and/or a prediction evaluation event. In these embodiments, such determinations are not triggered by an event in a primary game or based specifically on any of the plays of any primary games or any secondary games. That is, these events occur without any explanation or alternatively with simple explanations.

In one such embodiment, a progressive award increment event, a progressive award triggering event, a progressive award prediction event and/or a prediction evaluation event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a progressive award increment event, a progressive award triggering event, a progressive award prediction event and/or a prediction evaluation event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award increment event, a progressive award triggering event, a progressive award prediction event and/or a prediction evaluation event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a progressive award increment event, a progressive award triggering event, a progressive award prediction event and/or a prediction evaluation event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award increment event, a progressive award triggering event, a progressive award prediction event and/or a prediction evaluation event occurs based on a predefined variable reaching a defined parameter threshold. For example, when the 500,000$^{th}$ player has played an EGM (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In different embodiments, a progressive award increment event, a progressive award triggering event, a progressive award prediction event and/or a prediction evaluation event occurs based on a quantity of games played. In this embodiment, a quantity of games played is set for when one or more of such events or conditions will occur. In one embodiment, such a set quantity of games played is based on historic data.

In different embodiments, a progressive award increment event, a progressive award triggering event, a progressive award prediction event and/or a prediction evaluation event occurs based on time. In this embodiment, a time is set for when one or more of such events or conditions will occur. In one embodiment, such a set time is based on historic data.

In different embodiments, a progressive award increment event, a progressive award triggering event, a progressive award prediction event and/or a prediction evaluation event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a progressive award increment event, a progressive award triggering event, a progressive award prediction event and/or a prediction evaluation event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award increment event, a progressive award triggering event, a progressive award prediction event and/or a prediction evaluation event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a progressive award increment event, a progressive award triggering event, a progressive award prediction event and/or a prediction evaluation event to occur may be implemented in accordance with the gaming system and method of the present disclosure. It should be further appreciated that one or more of the above-described triggers pertaining to a progressive award increment event, a progressive award triggering event, a progressive award prediction event and/or a prediction evaluation event occurring may be combined in one or more different embodiments.

It should be appreciated that in different embodiments, one or more of:

i. when a progressive award increment event, a progressive award triggering event, a progressive award prediction event and/or a prediction evaluation event occurs;
ii. which aspects of a progressive award may predictions be wagered on;
iii. a quantity of aspects of a progressive award that predictions may be wagered on;
iv. whether a prediction is a correct or incorrect prediction;
v. an amount of a wager to be placed on a prediction;
vi. an award amount to be provided in association with a correct prediction; and/or
vii. any determination of the present disclosure is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

Gaming Systems

The above-described embodiments of the present disclosure may be implemented in accordance with or in conjunction with one or more of a variety of different types of gaming systems, such as, but not limited to, those described below. The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a gaming establishment floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3:
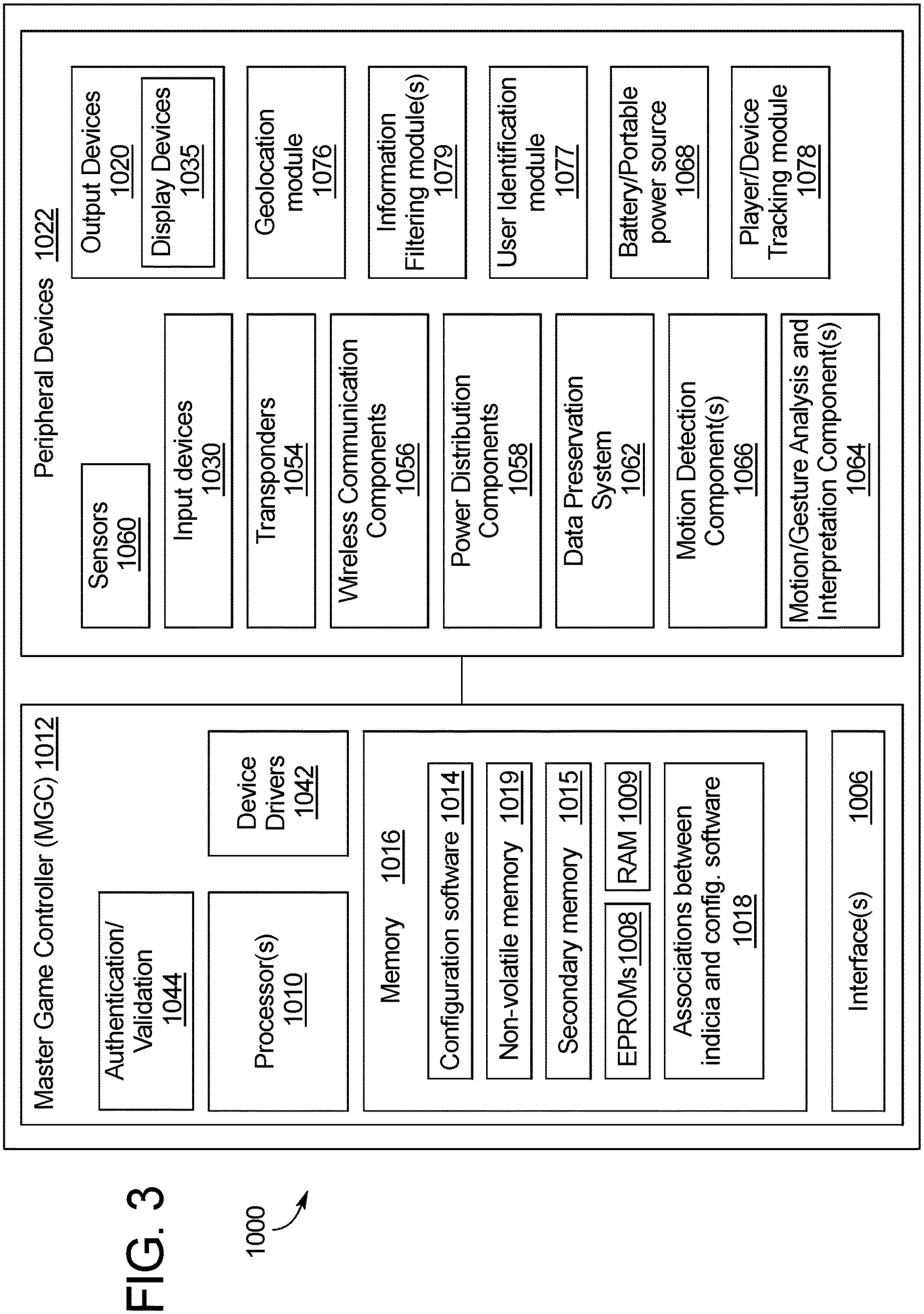
FIG. 3 is a schematic block diagram of one embodiment of an electronic configuration of an example electronic gaming machine of the present disclosure.
Figure 4A:
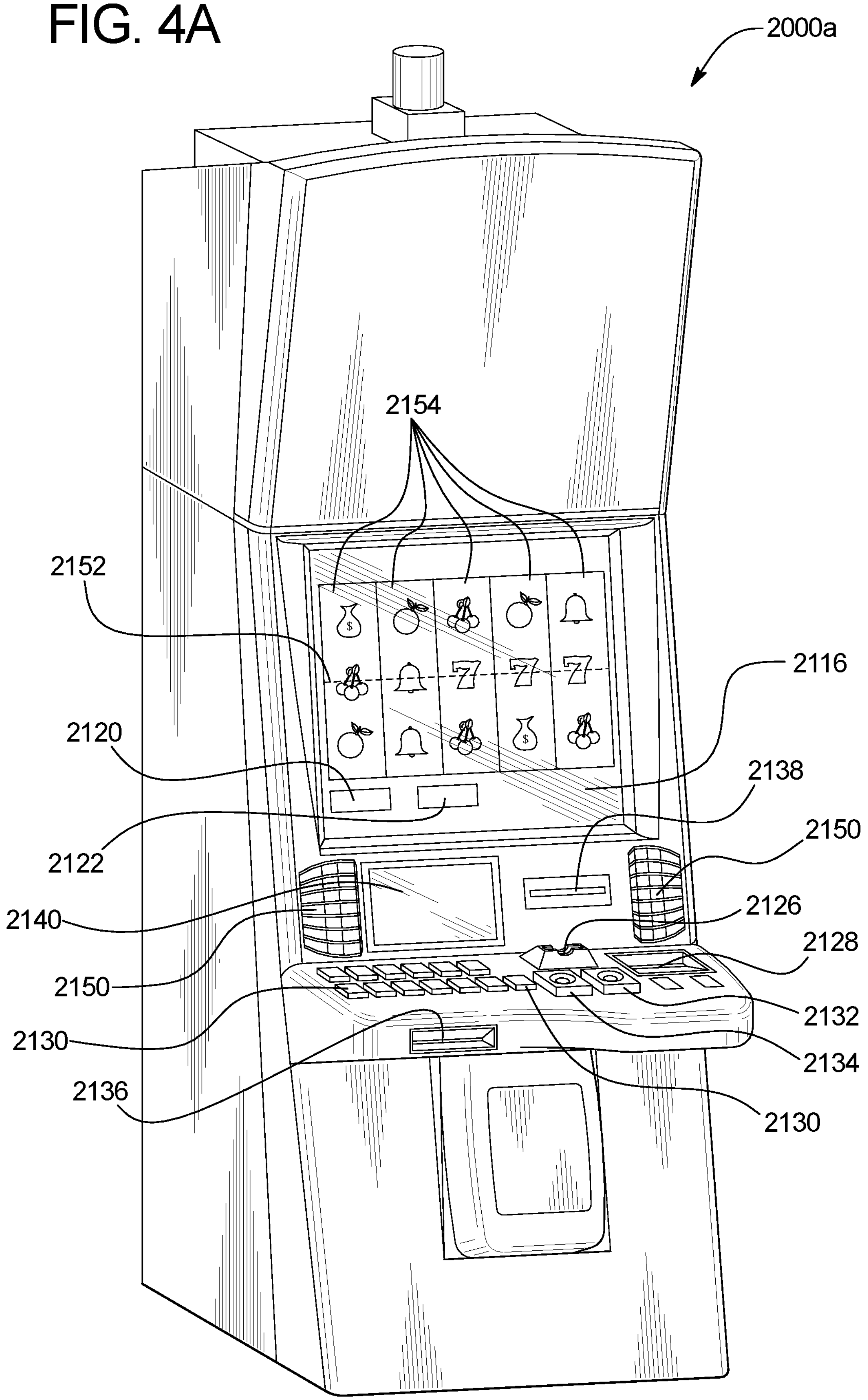
FIGS. 4A and 4B are perspective views of example alternative embodiments of the electronic gaming machine of the present disclosure.
Figure 4B:
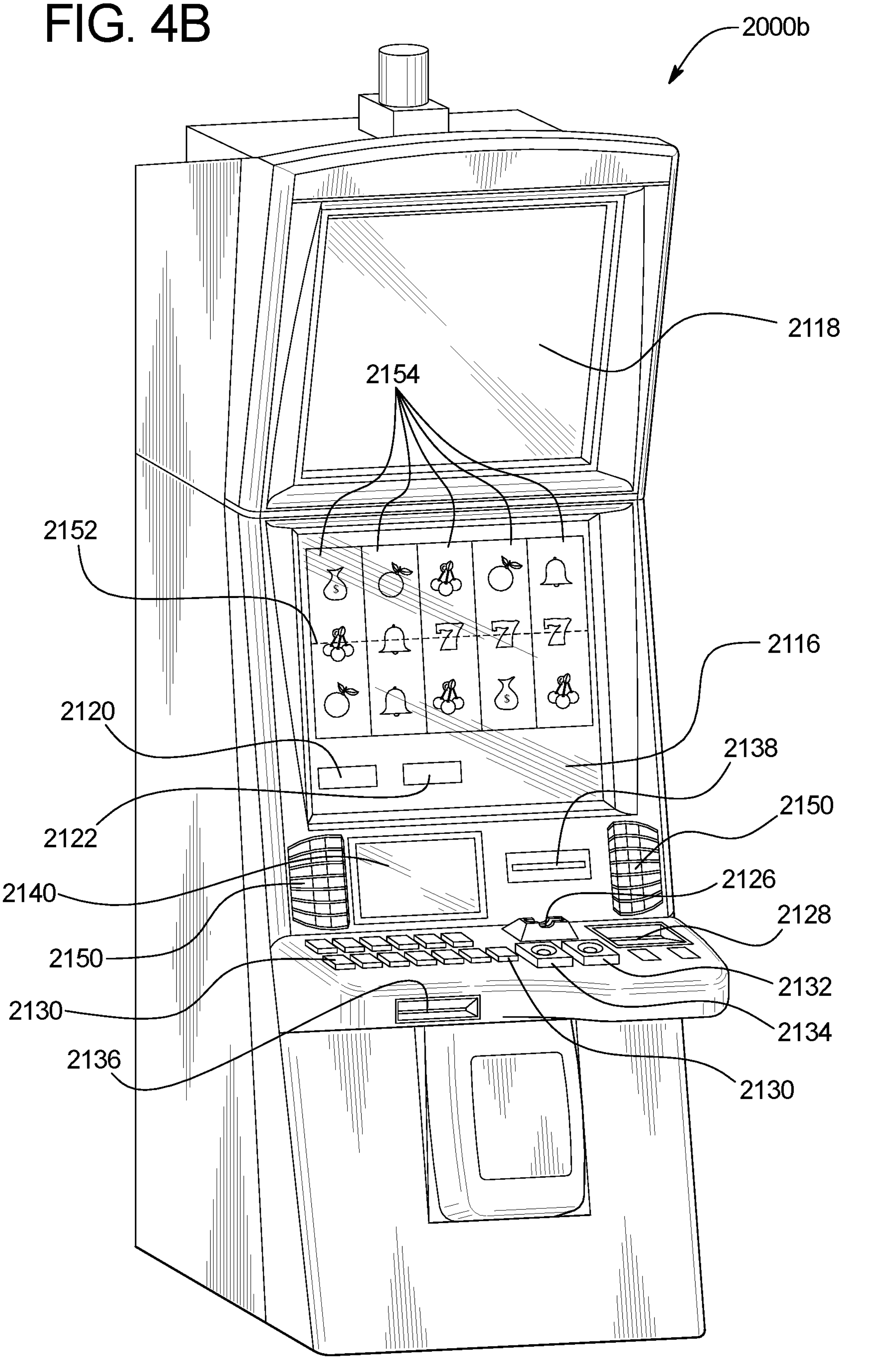
Figure 4C:
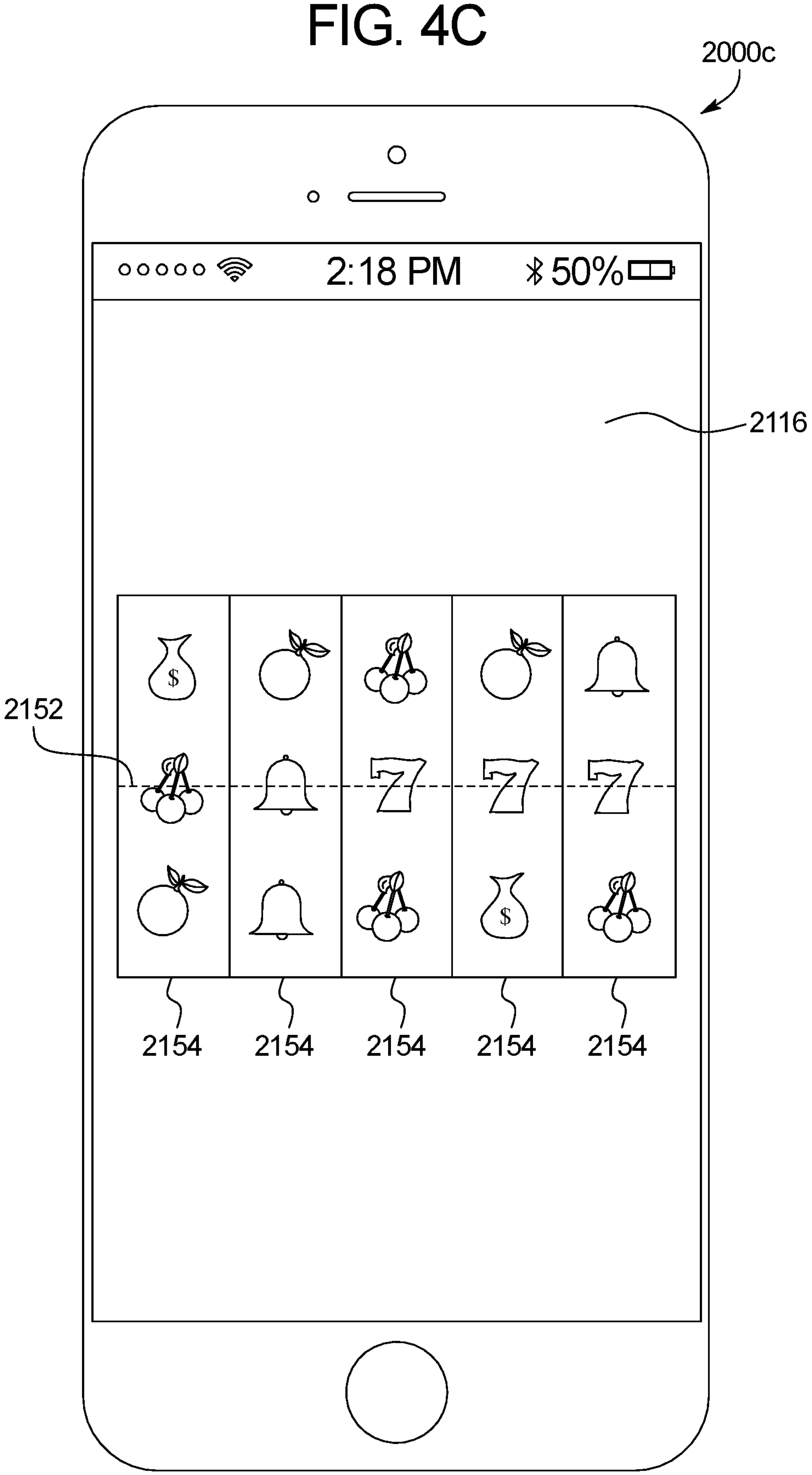
FIG. 4C is a front view of an example personal gaming device of the gaming system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. It should be appreciated that although certain processes are described with reference to one or more flowcharts, many other processes of performing the acts associated with such processes may be employed. For example, the order of certain of the illustrated blocks or diamonds may be changed, certain of the illustrated blocks or diamonds may be optional, or certain of the illustrated blocks or diamonds may not be employed.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (0 any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A device comprising:

a processor; and a first communication interface operable to communicate with a communication interface of an electronic gaming machine that operates with a gaming establishment floor management server within a gaming establishment ecosystem;

a second communication interface operable to communicate with a communication interface of a mobile gaming device that operates with a gaming establishment online server within the gaming establishment ecosystem;

a third communication interface operable to communicate with a personal gaming device that operates outside of the gaming establishment ecosystem by being independent of the gaming establishment floor management server and the gaming establishment online server;

a memory device that stores a plurality of instructions that, when executed by the processor, cause the processor to:

responsive to a receipt, via the first communication interface and from the electronic gaming machine, of data associated with a first input on a first predicted identity of an anonymous player winning a first award, following a first occurrence of a first award triggering event, and responsive to a determination that a second identity of a second player that won the first award and the first predicted identity comprise the same identity, communicate data that results in a display, by a display device of the electronic gaming machine, of a second award, responsive to a receipt, via the second communication interface and from the mobile gaming device, of data associated with a second input on a second predicted identity of the anonymous player winning the first award, following a second occurrence of the first award triggering event, and responsive to a determination that the second identity of the second player that won the first award and the second predicted identity comprise the same identity, communicate data that results in a display, by a display device of the mobile device, of the second award, and responsive to a receipt, via the third communication interface and from the personal gaming device of data associated with a third input on a third predicted identity of the anonymous player winning the first award, following a third occurrence of the first award triggering event, and responsive to a determination that the second identity of the second player that won the first award and the third predicted identity comprise the same identity, communicate data that results in a display, by a display device of the personal gaming device, of the second award.

2. The device of claim 1, wherein at least one of the first predicted identity, the second predicted identity, and the third predicted identity is associated with the anonymous player winning the first award at a first electronic gaming machine and the second identity is associated with a second electronic gaming machine.

3. The device of claim 1, wherein the first award comprises a first progressive award.

4. The device of claim 3, wherein the first progressive award is funded by wagers placed via any one of the electronic gaming machine and the mobile gaming device in association with a gaming establishment.

5. The device of claim 3, wherein the second award comprises a second, different progressive award.

6. The device of claim 5, wherein the second, different progressive award is funded by wagers placed via the personal gaming device independent of any gaming establishment.

7. The device of claim 1, wherein at least one of the first input on the first predicted identity, the second input on the second predicted identity and the third input on the third predicted identity comprises a wager placed to win the second award.

8. A device comprising:

a processor;

a first communication interface operable to communicate with a communication interface of an electronic gaming machine that operates with a gaming establishment floor management server within a gaming establishment ecosystem;

a second communication interface operable to communicate with a communication interface of a mobile gaming device that operates with a gaming establishment online server within the gaming establishment ecosystem;

a third communication interface operable to communicate with a personal gaming device that operates outside of the gaming establishment ecosystem by being independent of the gaming establishment floor management server and the gaming establishment online server; and a memory device that stores a plurality of instructions that, when executed by the processor, cause the processor to:

responsive to a receipt, via the first communication interface and from the electronic gaming machine, of data associated with an input on a first prediction having a first attribute and associated with a progressive award triggering event not occurring in association with a first period of time, and responsive to an occurrence of a prediction evaluation event and following a determination that the progressive award triggering event did not occur in accordance with the inputted first prediction, communicate data that results in a display, by a display device of the electronic gaming machine, of another award maintained separate from the progressive award, responsive to a receipt, via the second communication interface and from the mobile gaming device, of data associated with an input on a second prediction having a second, different attribute and associated with the same progressive award triggering event not occurring in association with the same first period of time, and responsive to the occurrence of the prediction evaluation event and following a determination that the progressive award triggering event did not occur in accordance with the inputted second prediction, communicate data that results in a display, by a display device of the mobile gaming device, of the another award maintained separate from the progressive award, and responsive to a receipt, via the third communication interface and from the personal gaming device, of data associated with an input on a third prediction having a third, different attribute and associated with the same progressive award triggering event not occurring in association with the same first period of time, and responsive to the occurrence of the prediction evaluation event and following a determination that the progressive award triggering event did not occur in accordance with the inputted third prediction, communicate data that results in a display, by a display device of the personal gaming device, of the another award maintained separate from the progressive award.

9. The device of claim 8, wherein the first prediction associated with the progressive award triggering event not occurring comprises a prediction that a final value of the progressive award will be greater than a predicted final value.

10. The device of claim 8, wherein the first prediction associated with the progressive award triggering event not occurring comprises a prediction that the progressive award will not be triggered prior to a point in time.

11. The device of claim 8, wherein the first attribute comprises a first wager amount to be placed to win the another award maintained separate from the progressive award and the second, different attribute comprises a second, different wager amount to be placed to win the another award.

12. The device of claim 8, wherein the first attribute comprises a first amount of the another award maintained separate from the progressive award and the second, different attribute comprises a second, different amount of the another award.

* * * * *